(12) United States Patent
Line et al.

(10) Patent No.: US 9,586,506 B2
(45) Date of Patent: Mar. 7, 2017

(54) REAR SEAT CUSHION WITH H-POINT ARTICULATION

(71) Applicant: Ford Global Technologies, LLC, Dearborn, MI (US)

(72) Inventors: Johnathan Andrew Line, Northville, MI (US); Robert Damerow, Garden City, MI (US); Patrick Maloney, Dearborn, MI (US); Sean David Fannin, Taylor, MI (US); Balakrishna Reddy, Farmington, MI (US); Mandeep Singh Sidhu, Canton, MI (US); Christian J. Hosbach, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 14/505,555

(22) Filed: Oct. 3, 2014

(65) Prior Publication Data

US 2016/0096459 A1    Apr. 7, 2016

(51) Int. Cl.
| | |
|---|---|
| *A47C 1/00* | (2006.01) |
| *B60N 2/50* | (2006.01) |
| *B60N 2/44* | (2006.01) |
| *B60N 2/02* | (2006.01) |
| *B60N 2/68* | (2006.01) |
| *B60N 2/18* | (2006.01) |

(52) U.S. Cl.
CPC ........... *B60N 2/506* (2013.01); *B60N 2/0232* (2013.01); *B60N 2/181* (2013.01); *B60N 2/1875* (2013.01); *B60N 2/4435* (2013.01); *B60N 2/505* (2013.01); *B60N 2/68* (2013.01); *B60N 2002/024* (2013.01); *B60N 2002/0236* (2013.01)

(58) Field of Classification Search
CPC .... B60N 2/506; B60N 2/0232; B60N 2/4435; B60N 2/505
USPC .................................................. 297/330, 337
See application file for complete search history.

(56) References Cited

U.S. PATENT DOCUMENTS

| | | | | |
|---|---|---|---|---|
| 4,181,354 A | * | 1/1980 | Grass ..................... | B60N 2/502 248/564 |
| 4,509,796 A | * | 4/1985 | Takagi ..................... | A47C 7/16 297/452.55 |
| 5,154,402 A | * | 10/1992 | Hill ........................ | B60N 2/502 248/429 |
| 5,358,305 A | * | 10/1994 | Kaneko ................ | B60N 2/0224 180/89.14 |
| 6,053,575 A | * | 4/2000 | Bauer .................. | B60N 2/1615 297/318 |

(Continued)

FOREIGN PATENT DOCUMENTS

EP           0526842 B1      4/1997

*Primary Examiner* — Laurie K Cranmer
(74) *Attorney, Agent, or Firm* — Vichit Chea; Price Heneveld LLP

(57) ABSTRACT

A vehicle seat assembly includes a seat pan and four linkage arms individually pivotably coupled with the seat pan. The assembly further includes a mounting plate, each of the four linkage arms being pivotably coupled therewith. A gear rack is coupled with the seat pan and defines an articulation path therefor, and a pinion is operably engaged with the rack to drive articulation of the seat pan including pivoting of the four linkage arms and sliding of the mounting plate.

18 Claims, 8 Drawing Sheets

(56) References Cited

U.S. PATENT DOCUMENTS

| | | | | |
|---|---|---|---|---|
| 6,428,102 B1* | 8/2002 | Becker | ............... | B60N 2/0284 |
| | | | | 297/337 |
| 7,281,749 B2* | 10/2007 | Yamada | ............... | B60N 2/0244 |
| | | | | 296/65.05 |
| 7,631,939 B2* | 12/2009 | Wulf | ............... | B60N 2/0232 |
| | | | | 297/330 |
| 8,240,766 B2* | 8/2012 | Gilbert | ............... | B60N 2/0232 |
| | | | | 248/421 |
| 8,616,645 B2* | 12/2013 | Ito | ............... | B60N 2/1615 |
| | | | | 297/344.15 |
| 8,888,181 B2* | 11/2014 | Perraut | ............... | B60N 2/23 |
| | | | | 297/284.11 |
| 2004/0075322 A1* | 4/2004 | Jaeger | ............... | B60N 2/0224 |
| | | | | 297/325 |
| 2013/0278031 A1* | 10/2013 | Kostin | ............... | B60N 2/1615 |
| | | | | 297/330 |

* cited by examiner

REAR SEAT CUSHION WITH H-POINT ARTICULATION

FIELD OF THE INVENTION

The present invention generally relates to a mounting assembly for a vehicle cushion. Specifically, the mounting assembly can be used to provide articulation of a rear seat cushion approximately about the hip-point of an occupant.

BACKGROUND OF THE INVENTION

Motor vehicles include a number of seats that may be adjustable and are often configured in different manners depending on the location of the seat within the motor vehicle. Rear vehicle seats may be arranged in a bench configuration, with the seats provided thereby, e.g. middle, driver-side, and passenger-side extending generally continuously or contiguously across the vehicle.

In many applications, such rear seats may not be adjustable at all, the cushion and seatback being fixed relative to the floor and the rear wall of the vehicle, respectively. In other applications where rear seats are made adjustable, the cushion may simply slide fore and aft within the vehicle along a limited range or may articulate by raising and lowering of the front and/or back of the cushion, which is often done independently with no regard for the manner in which the cushion moves during such articulation. In this and other modes of cushion adjustment, the movement may vary, sometimes significantly, from the natural movement of the body parts supported by the vehicle seat. Accordingly, such adjustment may result in an uncomfortable positioning of such body parts, requiring adjustment of the occupant's positioning after seat adjustment.

For these and other reasons, further advances in the adjustment of vehicle seats and the mechanisms that provide this adjustment may be desired.

SUMMARY OF THE INVENTION

According to one aspect of the present invention, a vehicle seat assembly includes a seat pan and four linkage arms individually pivotably coupled with the seat pan. The assembly further includes a mounting plate, each of the four linkage arms being pivotably coupled therewith. A gear rack is coupled with the seat pan and defines an articulation path therefor, and a pinion is operably engaged with the rack to drive articulation of the seat pan including pivoting of the four linkage arms and sliding of the mounting plate.

According to another aspect of the present invention, a motor vehicle seat includes a base platform, a cushion, and a mounting assembly. The mounting assembly has a linkage mechanism slidably mounted on the base platform and coupled with the cushion. The seat further includes a drive mechanism coupled between the base platform and the linkage mechanism and defining a movement path for the cushion with respect to the base platform, the movement path including articulation about the linkage mechanism and sliding of the linkage mechanism with respect to the base platform.

According to another aspect of the present invention, a mounting assembly for a vehicle seat cushion includes a cushion support defining a front and a back. A mounting plate underlies the support between the front and the back thereof and has a first track portion coupled thereto. A front linkage arm is coupled between the mounting plate and the cushion support adjacent the front, and a rear linkage arm is coupled between the mounting plate and the cushion support adjacent the back thereof.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
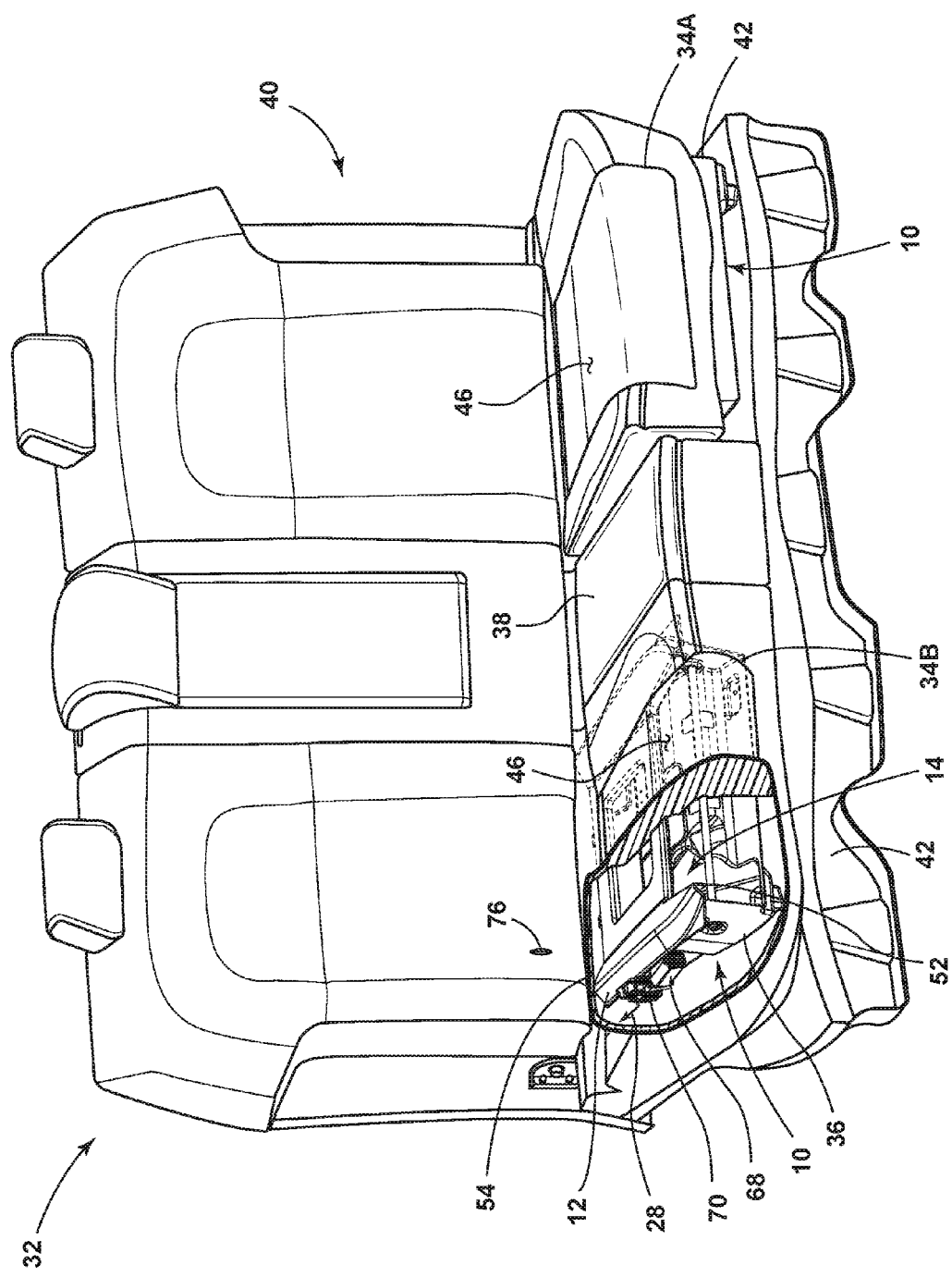
FIG. 1 is a front perspective view of a rear vehicle seat mounted on a portion of the vehicle body, the seat including a cutaway showing a mounting mechanism for the cushion thereof.
Figure 2:
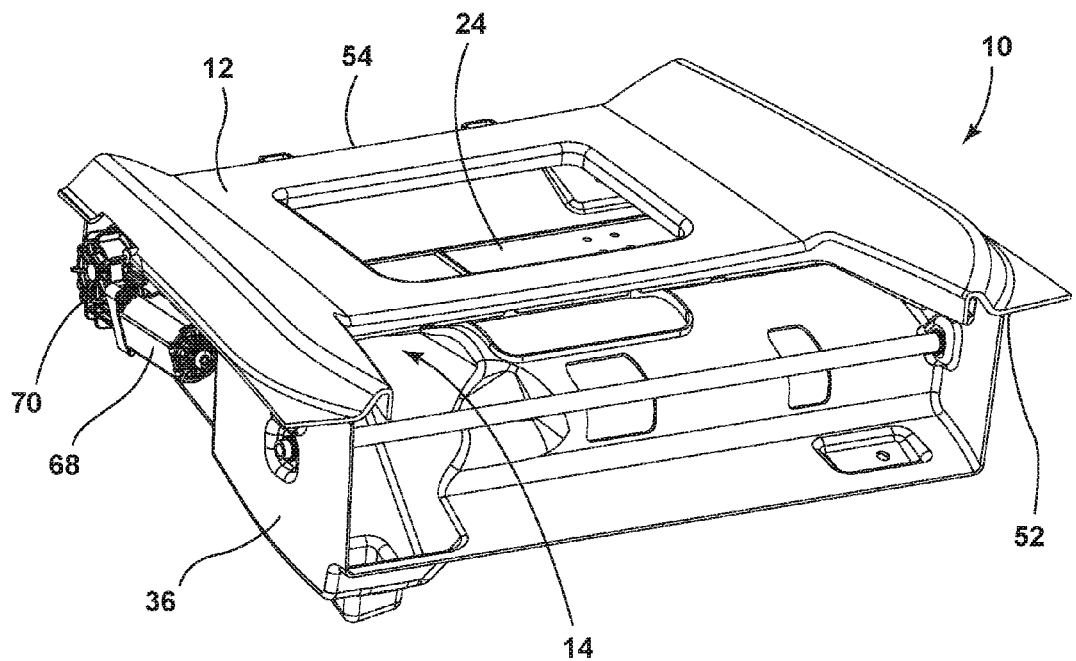
FIG. 2 is a front-right side perspective view of the mounting assembly of FIG. 1.
Figure 3:
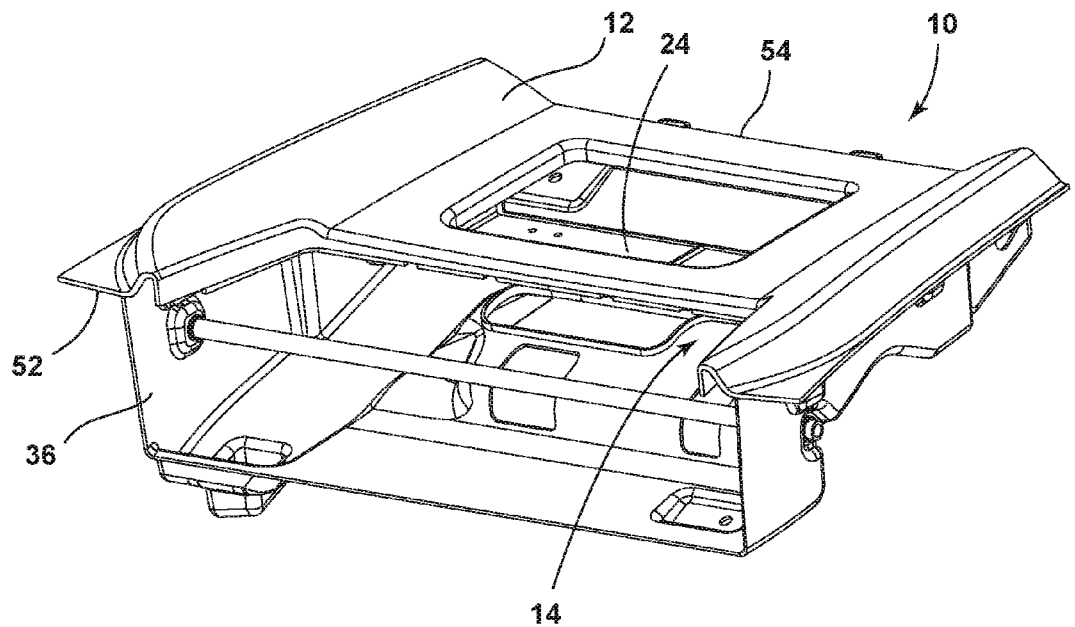
FIG. 3 is a front-left side perspective view of the mounting assembly.
Figure 4:
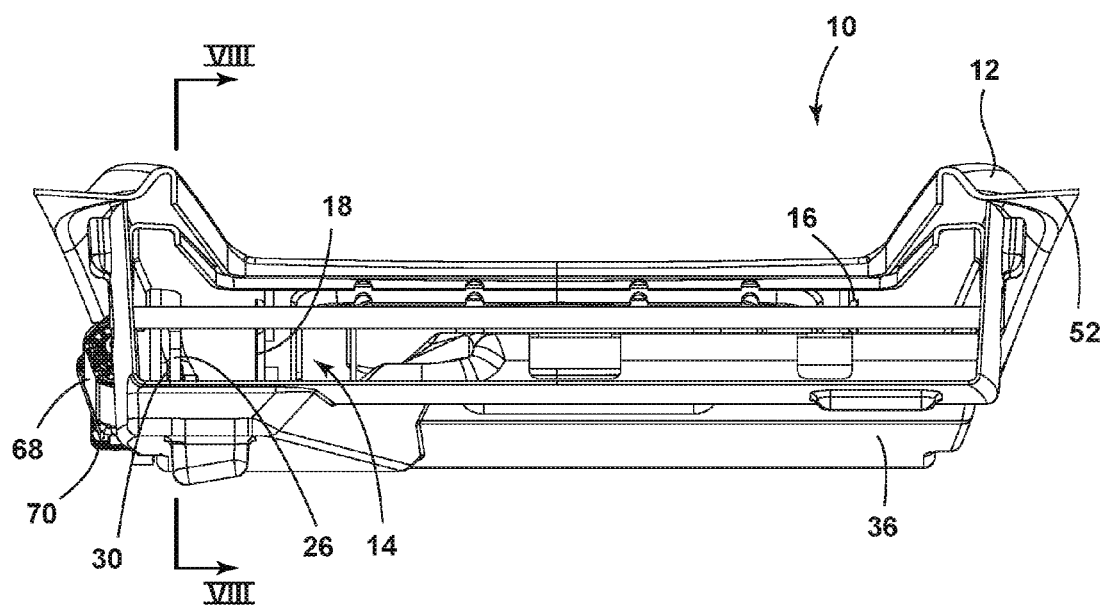
FIG. 4 is a front elevation view of the mounting assembly.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a vehicle seat assembly in the form of a cushion mounting assembly, for example. The assembly 10 includes a cushion support in the form of a seat pan 12 and a mounting assembly 14 including four linkage arms 16, 18, 20, and 22 pivotally coupled with the seat pan 12. The assembly 10 also includes a mounting plate 24, each of the four linkage arms 16, 18, 20, and 22 being pivotally coupled therewith. A gear rack 26 is coupled with the seat pan 12 and defines an articulation path 28 for the seat pan 12. A pinion 30 is operably engaged with the rack 26 to drive articulation of the seat pan 12, the articulation including pivoting of the four linkage arms 16, 18, 20, and 22 and sliding of the mounting plate 24.

As further illustrated in FIG. 1, assembly 10 can be included in a motor vehicle seat 32 so as to mount a seat cushion 34 in an articulating manner on a base 36. As shown in FIG. 1, the vehicle seat 32 can be a rear vehicle seat including a driver side cushion 34a and a passenger-side cushion 34b on opposite sides of a middle cushion 38 and arranged in a bench configuration adjacent a common seat-back 40. Separate assemblies 10 can, accordingly, be used in connection with both driver side cushion 34a and passenger side cushion 34b to allow each of such cushions 34a and 34b to be adjusted independently from each other and further independent from seatback 40, which may or may not be adjustable, according to a separate mounting arrangement therefor. In the example shown in FIG. 1, middle cushion 38 can be stationary. In another embodiment, a variation of the seat assembly 10 described herein can be used in connection with middle cushion 38 such that middle cushion 38 can be adjustable in a similar manner to driver side cushion 34a and passenger side cushion 34b. In a further alternative example, a single cushion can extend the entire width of the vehicle (in a modification of vehicle seat 32 shown in FIG. 1) such that one or more seat assemblies 10 of the type generally discussed herein can make the single cushion adjustable in a similar manner that which is discussed further below.

As mentioned previously, assembly 10 can adjustably mount cushion 34a or 34b to a platform 42 that, as shown in the example shown in FIG. 1 of a rear vehicle seat 32, can be formed into the body of a motor vehicle so as to elevate assembly 10 above an adjacent floor of the vehicle (not shown). In such a manner, base 36 of assembly 10 can rest on and be coupled with platform 42. Assembly 10 can, thusly, mount cushion 34a or 34b to platform 42 by resting on and being coupled with seat pan 12. Cushions 34a and 34b define a seating surface 46, which can be of a fabric or leather material, for example, with cushions 34a and 34b, as well as middle cushion 38, giving support and a general shape therefor. Cushions 34a and 34b can be coupled with seat pan 12 to provide the coupling of cushion 34a or 34b with assembly 10. As shown, both cushion 34a and 34b can extend outwardly from seat pan 12 and downwardly so as to cover assembly 10 from view, at least through a portion of the range of motion provided by assembly 10.

As shown in FIGS. 2-7, assembly 10 includes a number of components that both support seat pan 12 with respect to base 36 and facilitate articulation of seat pan 12. Accordingly, such components, described herein, support and provide articulation for a respective one of cushions 34a and 35b along path 28. As shown in the exploded view of FIG. 5, as well as the partial views of assembly 10 shown in FIGS. 6 and 7, such components are generally included in a mounting assembly 14 and a drive mechanism 50. Mounting assembly 14 includes the aforementioned mounting plate 24 as well as the arms 16, 18, 20, and 22, which are pivotally coupled therewith. As shown, arms 16, 18, 20, and 22 are arranged in pairs with arms 16 and 18 extending from mounting plate 24 toward the front 52 of seat pan 12, and arms 20 and 22 extending from mounting plate 24 toward the rear 54 of seat pan 12, with respective ones of each pair positioned toward the driver side of seat pan 12 and toward the passenger side of seat pan 12. In this arrangement, seat pan 12 is thusly coupled with and over mounting plate 24 disposed generally centrally with respect thereto (i.e. between front end 52 and rear side 54) by thusly formed linkage mechanisms on opposing sides of mounting plate 24, one of which includes arm 16 and arm 20, and the other of which includes arm 18 and arm 22 in respective pairs.

As further shown in FIGS. 2-7, the pivotal coupling of arms 16, 18, 20, and 22 respectively with seat pan 12 and with mounting plate 24 is such that seat pan 12 is supported by mounting plate 24 and is generally moveable with respect thereto in an articulating motion prescribed by the respective lengths and positions of the front arms 16 and 18, as well as the rear arms 20 and 22. Such articulation is discussed in further detail below. Mounting plate 24 is slidably coupled with base 36 by a track 56 including a first portion 58 rigidly coupled with mounting plate 24 and a second portion 60 rigidly coupled with base 36. First portion 58 of track 56 is slidable with respect to second portion 60 along a sliding direction 62 such that the seat pan 12 is further moveable by translation thereof along sliding direction 62.

Figure 5:
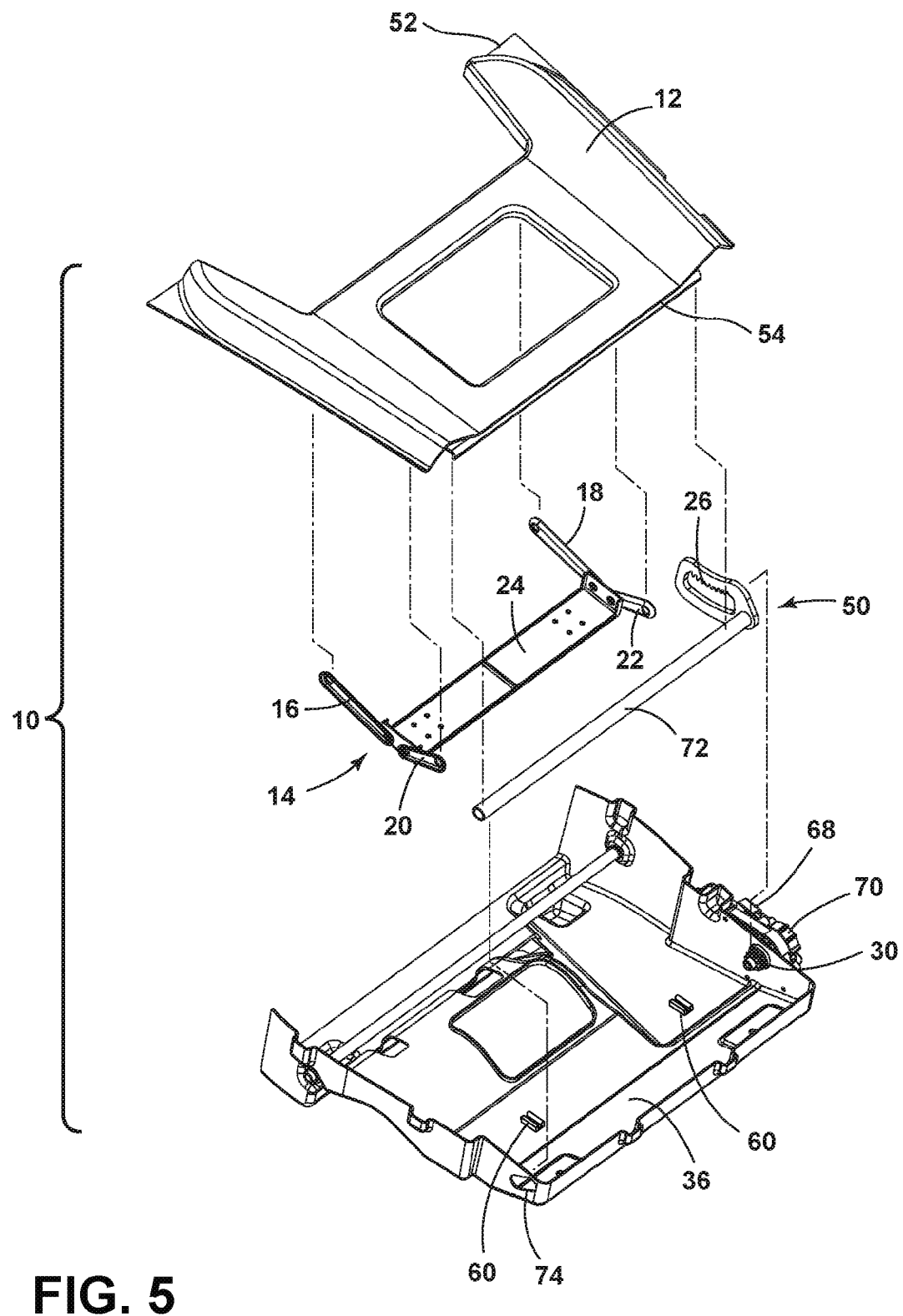
FIG. 5 is an exploded perspective view of the mounting assembly of FIG. 1.
Figure 6:
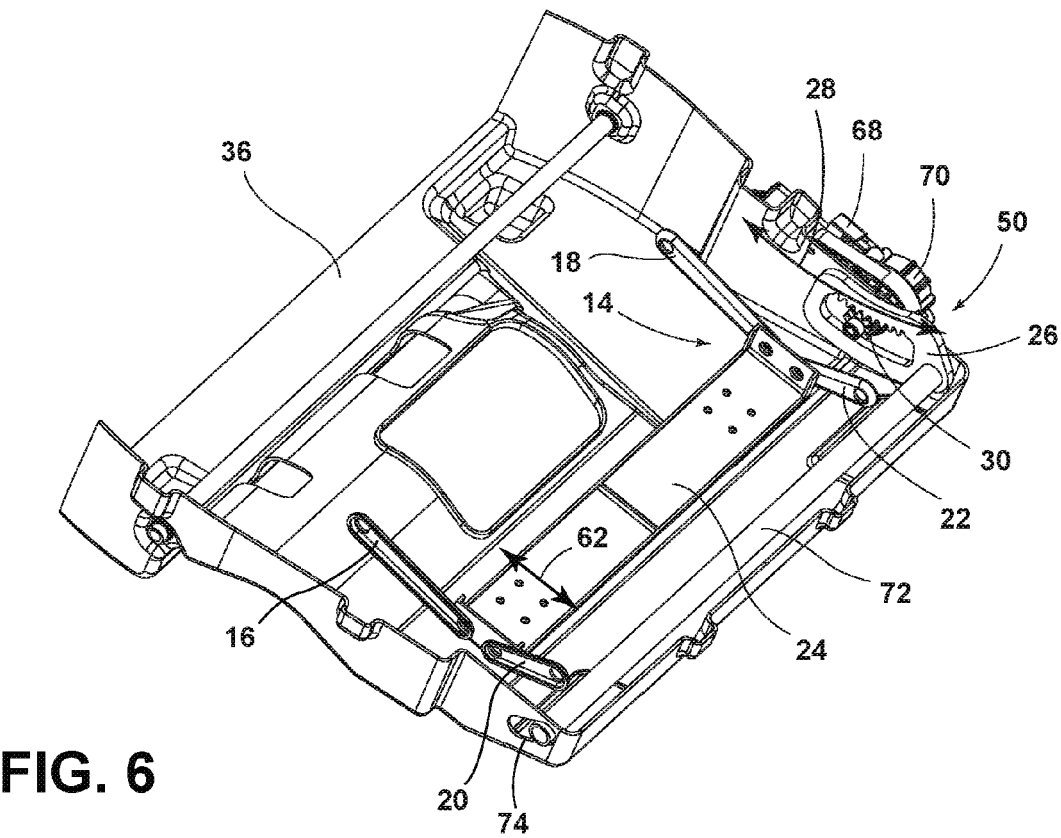
FIG. 6 is a partial view of the mounting assembly showing various components thereof.
Figure 7:
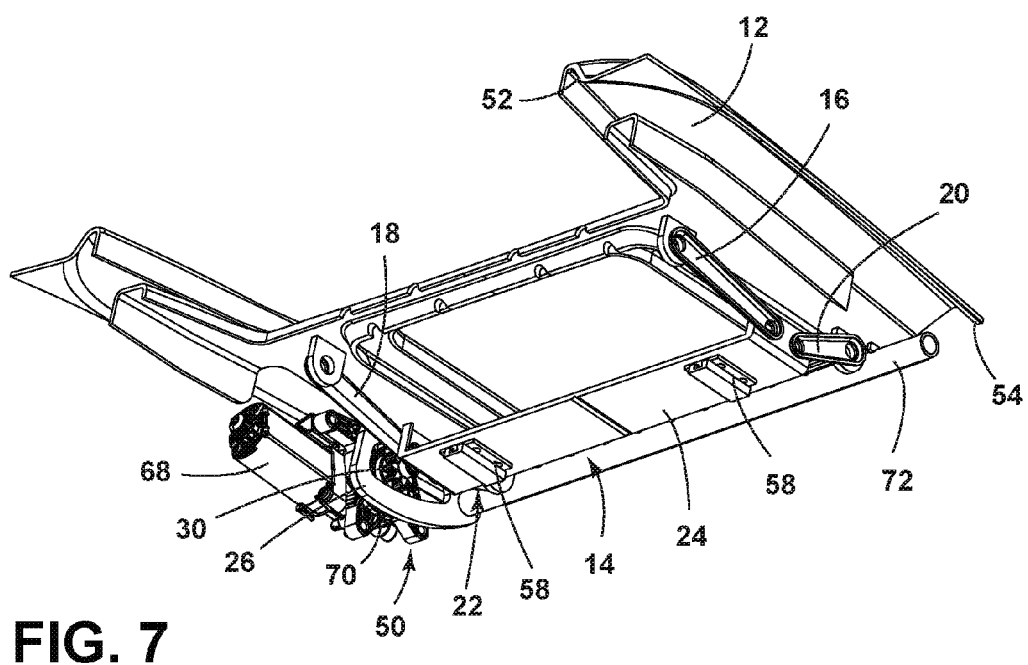
FIG. 7 is an alternative partial view of the mounting assembly showing further components thereof.
Figure 9:
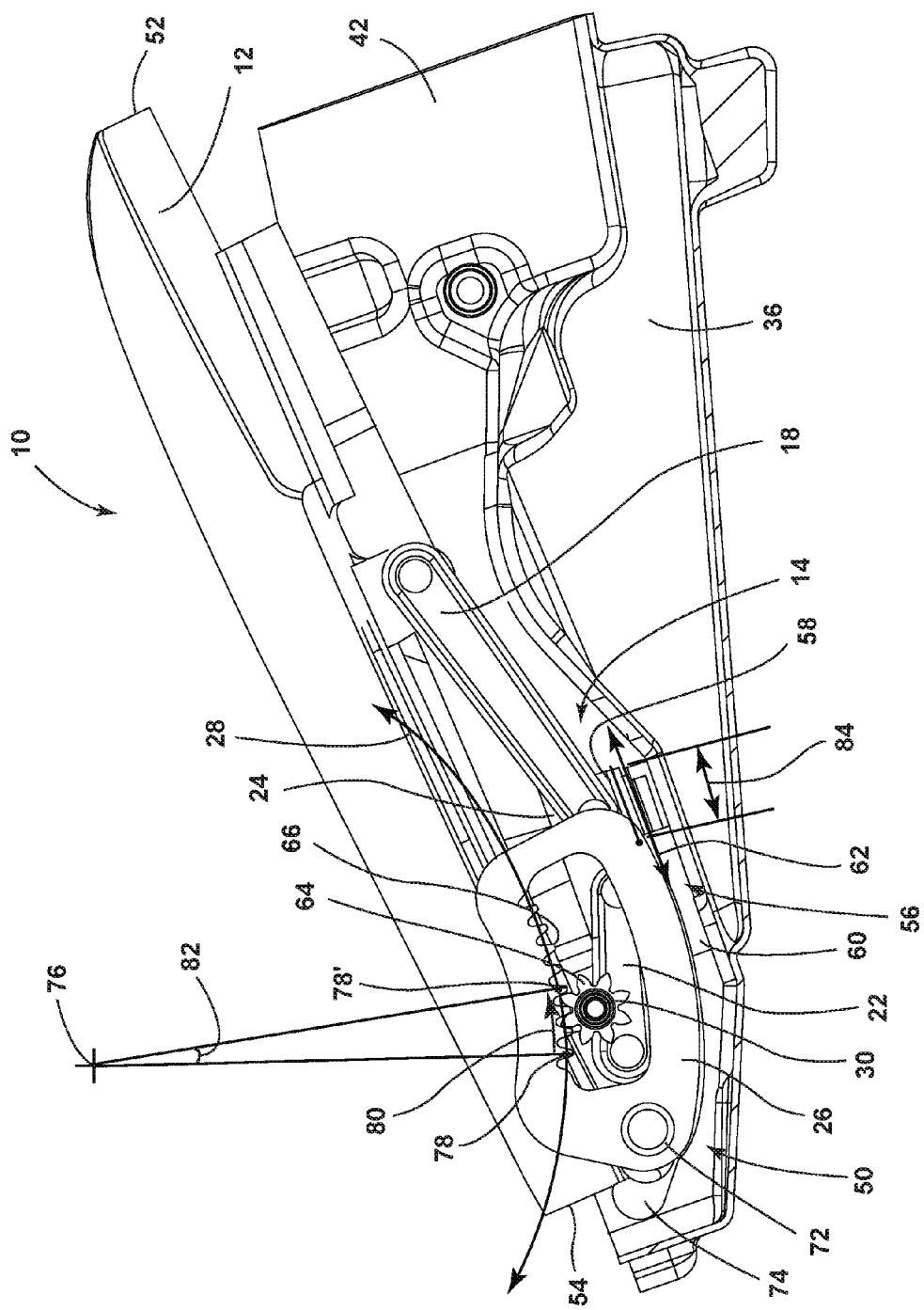
FIG. 9 is a side view of the cross-sectional mounting assembly of FIG. 8 in a reclined position.
Figure 10:
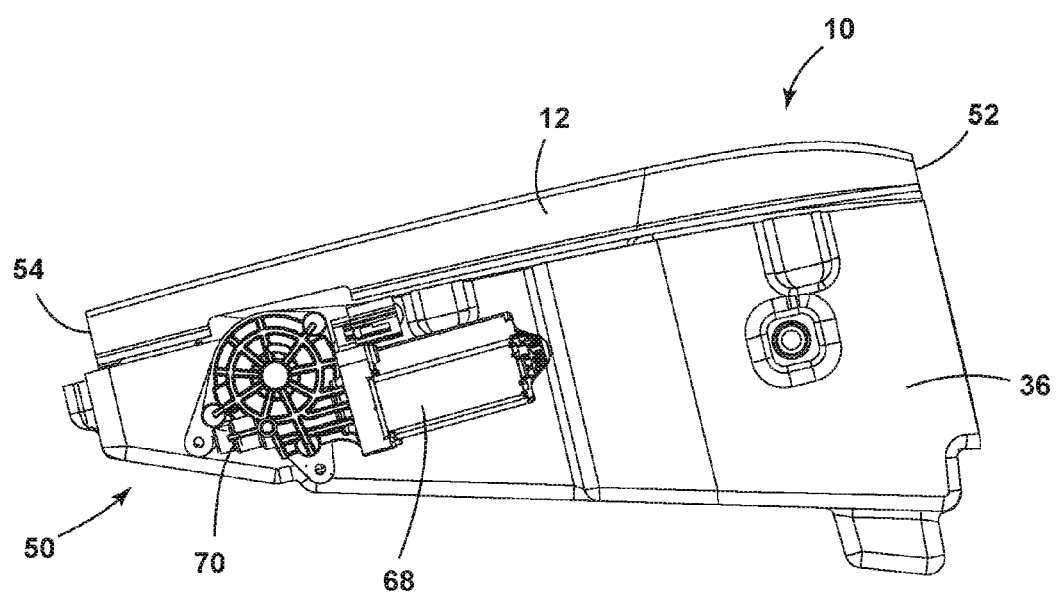
FIG. 10 is a side elevation view of the mounting assembly.

With continued reference to FIG. 7, the articulating and translational movement of seat pan 12 with respect to base 36 can result in a large variation of available movement paths consisting of both articulation of seat pan 12 about arms 16, 18, 20 and 22 as well as sliding of mounting plate 24 with respect to base 36 in varying amounts. Accordingly, drive mechanism 50 is adapted to cause motion of seat pan 12 along a particular articulation path 28 within the range of possible articulation motions provided by a combination of pivoting of arms 16, 18, 20, and 22 with respect to mounting plate 24 in translation of mounting plate 24 itself. As shown in FIGS. 5-7, drive mechanism 50 includes both pinion 30 rotatably coupled with base 36 and gear rack 26 coupled with seat pan 12. Pinion 30 includes a plurality of teeth 64 that engage with a plurality of teeth 66 formed along gear rack 26. A resulting operable engagement between pinion 30 and gear rack 26 is such that rotation of pinion 30 causes movement of gear rack 26 thereover. As shown in FIGS. 7 and 9, rotation of pinion 30 can be driven by a motor 68 coupled with base 36 and connected with pinion 30 through a reduction mechanism 70. Accordingly, coupling of pinion 30 with an output end of reduction mechanism 70 can serve to mount pinion 30 in a generally fixed location along an interior of base 36, while allowing motor 68 to cause rotational motion of pinion 30 within such location. In an embodiment, motor 68 can be a 12-volt, direct current ("DC") motor, although other suitable motors can also be used. Reduction mechanism 70 can include a plurality of internal gears operably engaged with each other and configured to change the output direction of motor 68 so as to be aligned with the positioning of pinion 30 and/or to provide appropriate adjustment to the operational speed or torque with which motor 68 operates.

As further shown in FIGS. 5 and 6, gear rack 26 is connected with seat pan 12 by a connecting rod 72 that extends laterally from gear rack 26 and extends along seat pan 12 adjacent the rear side 54 thereof. As further shown in FIG. 6, connecting rod 72 can engage with a slot 74 present in a portion of base 36 on the side thereof opposite pinion 30. The engagement of connecting rods 72 with slot 74 can further help to provide support for seat pan 12 and corresponding one of cushion 34a or 34b as well as guidance for the movement of the rear side 54 of seat pan 12 during movement thereof along articulation path 28, with which a portion of slot 74 can extend in a concentric manner.

The components of seat assembly 10 described above with reference to FIGS. 1-7, including base 36, seat pan 12, and the components of mounting assembly 14, including mounting plate 24 and arms 16, 18, 20, and 22, can be made of any material providing adequate strength to support cushions 34a or 34b on platform 42 during movement of the associated vehicle, as well as to maintain a desired position of cushion 34a or 34b along articulation path 28 and to facilitate movement therealong. Such materials can include various metals, metal alloys, plastics, and composite materials. Examples of suitable materials include aluminum and/or various aluminum alloys, magnesium alloy, steel, including stainless steel or various other steels. Similarly, pinion 30, gear rack 26, and connecting rod 72 of drive mechanism 50 can be made of similar materials or other materials which may be suitable for driving the movement of cushion 34a or 34b, as described further below, and maintaining a selected position of cushion 34a or 34b, including during movement of the associated vehicle. In one example, gear rack 26 and connecting rod 72 can be integrally formed of a metal material, including aluminum, steel, or the like. In other examples, pinion 30 can be of metal, including aluminum, steel, or the like, or of a plastic material, such as nylon, various composite plastics, or the like, which may provide for reduced friction within the operable connection between pinion 30 an gear rack 26, thereby eliminating or reducing the need for the use of mechanical lubricants in connection therewith.

Figure 8:
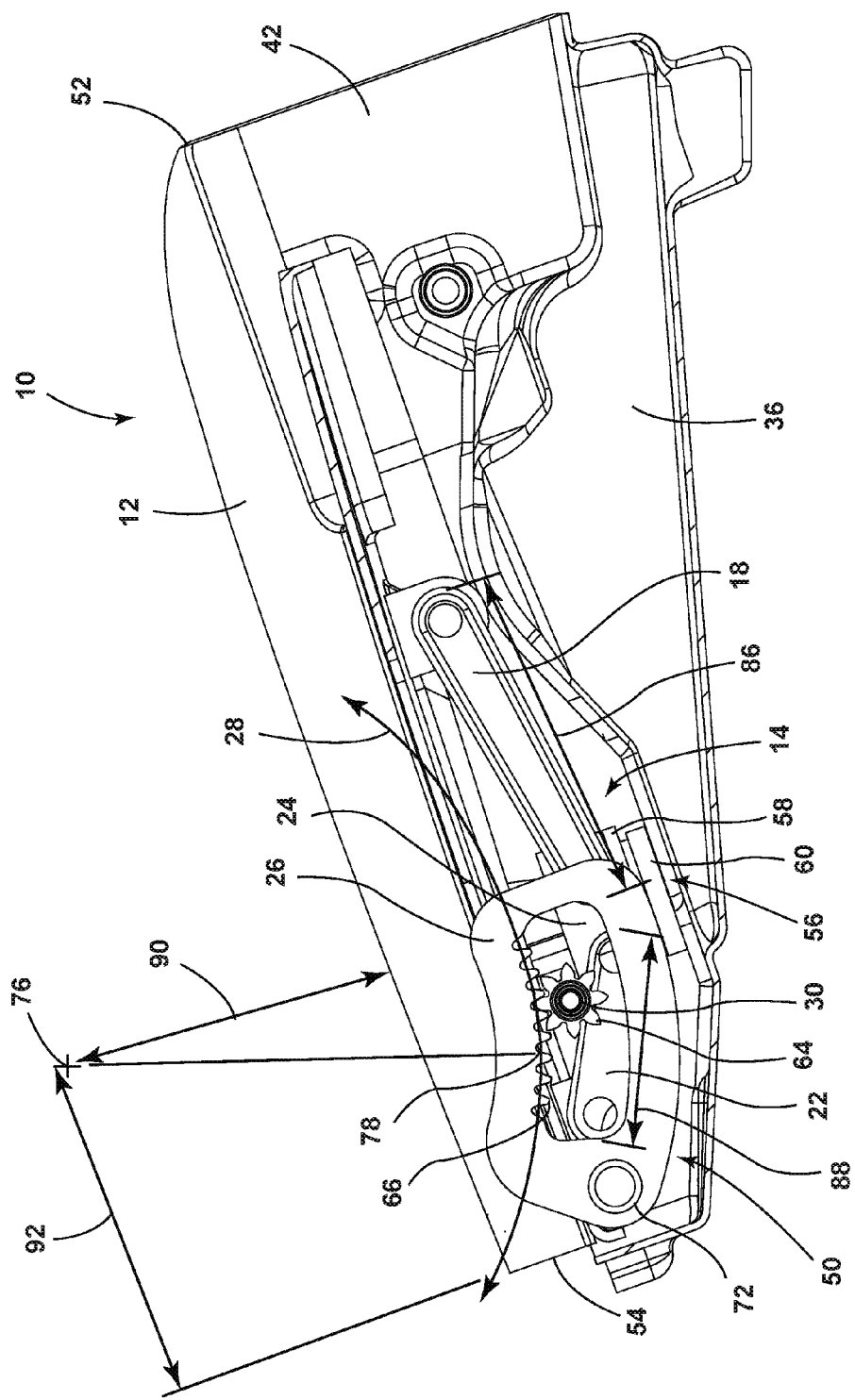
FIG. 8 is a side view of the mounting assembly in a normal position taken along line VIII-VIII in FIG. 7.

Further aspects of the geometry of the above-described components of assembly 10, including mounting assembly 14 and drive mechanism 50 are discussed with respect to the cross-sectional views of assembly 10 shown in FIGS. 8 and 9, respectively illustrating assembly 10 in a normal position (FIG. 8) such that seat pan 12 is at a first end of the range of motion thereof and a reclined position (FIG. 9) in which seat pan 12 is at a second end of a range of motion thereof, as provided by mounting assembly 14 and drive mechanism 50. As shown in FIGS. 8 and 9, assembly 10 is configured to move seat pan 12, and accordingly cushion 34 (which may be either may be cushion 34a or 34b, as shown in FIG. 1, but is generally referred to as cushion 34 with respect to FIGS. 2-10) along an illustrated articulation path 28. As illustrated, articulation path 28 is in the form of a radial, arcuate path about and articulation point 76 that is positioned generally on a side of seat pan 12 vertically opposite both mounting assembly 14 and drive mechanism 50. Accordingly, although articulation path 28 is illustrated along teeth 66 of gear rack 26 in FIGS. 8 and 9, additional articulation paths could be defined for seat pan 12 and/or cushion 34 with reference to additional features of assembly 10 showing similar movement about articulation point 76. FIG. 8 further shows a reference point 78 positioned along articulation path 28 at approximately a midpoint location along gear rack 26.

As shown in FIG. 9, articulation of seat pan 12 about articulation point 76 is achieved by coordinated movement of the components of both mounting assembly 14 and drive mechanism 50. As illustrated, such movement includes movement of gear rack 26 substantially along articulation path 28, as driven by rotation of pinion 30, as caused by motor 68. Such movement of gear rack 26 is illustrated by the position shown for reference point 78 in FIG. 8, located along gear rack 26 approximately along the midpoint thereof, as well as reference point 78', shown in FIG. 9, in the same location along gear rack 26 as point 78 in FIG. 8. FIG. 9 further shows the original location of reference point 78 in comparison to reference point 78'. As shown in FIG. 9, articulation of seat pan 12 includes movement of gear rack 26 along articulation path 28 in direction 80. Such movement reflects rotation of gear rack 26 about articulation point 76 through an angle 82, which can be through approximately 2° to about 10°, and in one embodiment approximately 6°. The distance of such rotation can be, accordingly, 2 cm and about 12 cm, and in one embodiment about 3 cm.

The angle 82 through which gear rack 26 is described as rotating about articulation point 76 can also reflect the angle through which seat pan 12 rotates about articulation point 76. Accordingly, the movement of gear rack 26 along articulation path 28 and with respect to pinion 30 can dictate the articulation of seat pan 12, and accordingly the respective cushion 34a or 34b achieved by assembly 10. Accordingly, and as noted above, mounting assembly 14 can provide for support of seat pan 12 with respect to base 36, while permitting a movement of seat pan 12, as described above, and as generally dictated by gear rack 26. As further discussed above, such movement can be accommodated by mounting assembly 14 through a combination of pivoting of arms 16, 18, 20, and 22 with respect to mounting plate 24 (as facilitated by pivotal coupling of arms 16, 18, 20 and 22 with seat pan 12) as well as sliding of mounting plate 24 with respect to base 36, by the mounting thereof on track 56. Such movement may include rotation of arms 16, 18, 20, and 22 through respective angles of between about 2° and about 5°. Further, mounting plate 24 may slide with respect to base 36 through a distance 84 along direction 62 of between about 2 cm and about 6 cm. In general distance 84 may be at least equal to an amount of rearward movement of seat pan 12 that would occur by rotation of arms 16, 18, 20, and 22 alone. Accordingly, the sliding of mounting plate 24 allows for forward translation of seat pan 12 and an overall movement for seat pan 12 that includes rotation about point 76.

The movement of seat pan 12 depicted between FIGS. 8 and 9 is generally such that front 52 of seat pan 12 moves generally upward through a distance of between about 5 cm and 7 cm. Similarly, the rear 54 of seat pan 12 moves generally downwardly through a corresponding distance of between 0.5 cm and about 3 cm. Such movement may be influenced by the positioning of mounting assembly 14 with respect to seat pan 12, and may be further influenced by the respective lengths 86 and 88 of front arms 16 and 18 and rear arms 20 and 22. In an example, length 88 of rear arms 20 and 22 may be between about 30% and 70% less than the length 86 of front arms 16 and 18, and in one example about 50% less. Such lengths 86 and 88 may also influence the location of articulation point 76 with respect to seat pan 12, and accordingly with respect to seating surface 46. As mentioned previously, assembly 10 is configured such that articulation point 76 is positioned on a side of seat pan 12 generally opposite the location of mounting assembly 14.

The positioning of point 76 illustrated in FIGS. 8 and 9 results in cushions 34a and 34b rotating approximately about a hip-point of a passenger seated in the vehicle seat 32 on the corresponding cushion 34a or 34b. In general, a passenger seated as such typically has legs and a pelvis supported by cushion 34a or 34b on the respective seat pan 12 of assembly 10. In accordance with the variation and potential leg and pelvis size and position of the seated passenger, the location of point 76 is positioned so as to align with a generally-estimated hip rotation point for a majority of potential passengers of the associated vehicle. More specifically, point 76 is positioned in a general area that is at least close to where the passenger's pelvis will likely connect with the passenger's legs. In addition, the seated passenger's back is supported by the seatback 40, which is also shaped to correspond to that of a majority of passengers. Accordingly, the hip-point of the seated passenger is positioned above the seating surface 46 and forward of seatback 40.

Upon translation between the normal position (FIG. 8) and the reclined position (FIG. 9), seat pan 12 pivots about point 76, and thusly, about an approximate location of the hip point of an occupant of the associated vehicle seat 32 on the corresponding cushion 34a or 34b. Rotational movement of cushion 34a or 34b about point 76, generally aligned with the occupant's hip point substantially reduces the longitudinal movement between seat surface 46 and the passenger's legs and/or may also reduce longitudinal movement between seatback 40 and the occupant's back. Either of such movements can commonly move passenger's clothing up or down relative to the passenger's back or legs. Accordingly, rotational movement of cushion 34a or 34b about point 76 will generally maintain consistent support of the passenger's legs, substantially reducing the frequency of adjusting the passenger's seated position forward or rearward on cushion 34a or 34b. It will be understood by one having ordinary skill in the art that construction of the described invention and other components is not limited to any specific material. Other exemplary embodiments of the invention disclosed herein may be formed from a wide variety of materials, unless described otherwise herein.

In one embodiment, articulation point 76 can be further located such that articulation point 76 may generally align with the location of a hip joint of an occupant of the associated vehicle seat 32. In an example, articulation point 76 can be positioned at a vertical distance 90 above seat pan 12 of between about 8 and 12 cm and a distance 92 from the rear 54 of seat pan 12 of between about 8 and 12 cm. In a further embodiment, articulation point 76 can be located at a vertical distance 90 of about 10 cm and a horizontal distance 92 of about 9 cm.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. A vehicle seat assembly, comprising:
   a seat pan;
   four linkage arms individually pivotably coupled with the seat pan;
   a mounting plate pivotably coupled with each of the four linkage arms;
   a gear rack coupled with the seat pan and defining an articulation path therefor; and
   a pinion operably engaged with the rack to drive articulation of the seat pan including pivoting of the four linkage arms and sliding of the mounting plate.

2. The vehicle seat assembly of claim 1:
   further including a fixed base;
   wherein:
     the linkage arms collectively support the seat pan over the mounting plate; and
     the mounting plate is slidably coupled with the base.

3. The vehicle seat assembly of claim 1, wherein the articulation path of the seat pan includes rotation of the seat pan about an articulation point disposed on a side thereof opposite the four linkage arms.

4. The vehicle seat assembly of claim 3, wherein the articulation point is positioned to align with a hip joint of an occupant.

5. The vehicle seat assembly of claim 1, wherein the four linkage arms are arranged in pairs of arms coupled with the mounting plate and the seat pan on respective opposite sides thereof.

6. The vehicle seat assembly of claim 5, wherein each of the pairs of arms includes a front arm extending from the mounting plate toward a front side of the seat pan and a rear arm extending from the mounting plate toward a rear side of the seat pan, the front arm having a first length and the rear arm having a second length less than the first length.

7. The vehicle seat assembly of claim 6, wherein the second length is less than 50% of the first length.

8. The vehicle seat assembly of claim 1, wherein:
   the mounting plate is slidable along a track extending in a sliding direction;
   the rack is coupled with the seat pan along a rear side thereof; and
   the articulation path defined by the rack extends partially in the sliding direction and further extends in a generally vertical direction.

9. The vehicle seat assembly of claim 8:
   further including a motor coupled with the pinion and operable to drive rotation of the pinion;
   wherein the rotation of the pinion, driven by the motor, causes movement of the rack along the pinion and along the path, such that movement of the rack causes sliding of the mounting plate in the sliding direction, vertical movement of the rear side of the seat pan, and pivoting of the four arms.

10. A motor vehicle seat, comprising:
a base platform;
a cushion; and
a mounting assembly including:
   a linkage mechanism slidably mounted on the base platform and coupled with the cushion; and
   a drive mechanism coupled between the base platform and the linkage mechanism and defining a movement path for the cushion with respect to the base platform including articulation about the linkage mechanism and sliding of the linkage mechanism with respect to the base platform, the drive mechanism including a rack coupled with the linkage mechanism and defining the movement path and a pinion coupled with the base platform and operably engaged with the rack to drive the articulation of the cushion about the linkage mechanism and the sliding of the linkage mechanism with respect to the base platform.

11. The motor vehicle seat of claim 10, wherein the movement path for the cushion is such that the cushion rotates about a point opposite the base platform.

12. The motor vehicle seat of claim 10, wherein:
the linkage mechanism includes a mounting plate that slidably couples the linkage mechanism with the base platform;
the articulation about the linkage mechanism includes translation of the cushion in a first direction and through a first distance relative to the mounting plate; and
the sliding of the linkage mechanism with respect to the base platform is such that the mounting plate translates in a second direction opposite the first direction and through a second distance at least equal to the first distance.

13. The motor vehicle seat of claim 10, wherein the linkage mechanism includes:
a mounting plate that slidably couples the linkage mechanism with the base platform;
a seat pan supporting the cushion and including a front and a rear;
a first linkage arm pivotably coupled with the mounting plate and extending to pivotably couple with the seat pan adjacent the front; and
a second linkage arm pivotably coupled with the mounting plate and extending to pivotably couple with the seat pan adjacent the rear.

14. The motor vehicle seat of claim 10, further including a seatback positioned adjacent the cushion, wherein the movement of the cushion is independent of any movement of the seatback.

15. A mounting assembly for a vehicle seat cushion comprising:
a cushion support defining a front and a back;
a mounting plate underlying the support between the front and the back, and having a plate track portion coupled thereto;
a front linkage arm having a first length and coupled between the mounting plate and the cushion support adjacent the front; and
a rear linkage arm having a second length that is less than 50% of the first length and coupled between the mounting plate and the cushion support adjacent the back.

16. The mounting assembly of claim 15, wherein the plate track portion extends in a direction from the back toward the front of the cushion support and is coupleable with a base track portion coupled with a portion of a vehicle interior.

17. The mounting assembly of claim 15, further comprising a drive mechanism coupled with the cushion support and defining a movement path therefor including rotation of the cushion support about an articulation point disposed on a side thereof opposite the mounting plate.

18. The mounting assembly of claim 17, wherein the articulation point is positioned to align with a hip joint of an occupant.

* * * * *